(12) United States Patent
Neuhaeuser

(10) Patent No.: US 12,526,878 B2
(45) Date of Patent: Jan. 13, 2026

(54) METHOD AND SYSTEM FOR TRANSFERRING A CALL FROM A MEANS OF TRANSPORTATION TO A MOBILE TERMINAL

(71) Applicant: Bayerische Motoren Werke Aktiengesellschaft, Munich (DE)

(72) Inventor: Michael Neuhaeuser, Sankt Wolfgang (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 357 days.

(21) Appl. No.: 18/030,589

(22) PCT Filed: Sep. 3, 2021

(86) PCT No.: PCT/DE2021/100730
§ 371 (c)(1),
(2) Date: Apr. 6, 2023

(87) PCT Pub. No.: WO2022/073535
PCT Pub. Date: Apr. 14, 2022

(65) Prior Publication Data
US 2023/0413381 A1    Dec. 21, 2023

(30) Foreign Application Priority Data

Oct. 7, 2020    (DE) .................. 10 2020 126 198.5

(51) Int. Cl.
*H04W 76/50* (2018.01)
*H04M 3/58* (2006.01)
*H04W 84/12* (2009.01)

(52) U.S. Cl.
CPC ............ *H04W 76/50* (2018.02); *H04M 3/58* (2013.01); *H04W 84/12* (2013.01)

(58) Field of Classification Search
CPC ....... H04W 76/50; H04W 84/12; H04W 4/80; H04W 4/16; H04W 4/90; H04W 4/40;
(Continued)

(56) References Cited

U.S. PATENT DOCUMENTS 7,200,409 B1 * 4/2007 Ichikawa ............. G08B 25/016
455/556.1
2010/0227582 A1 * 9/2010 Berry .................. H04M 1/6091
455/404.1
(Continued)

FOREIGN PATENT DOCUMENTS

DE       600 18 263 T2    8/2005
DE    10 2015 107 505 A1   11/2015
(Continued)

OTHER PUBLICATIONS

International Search Report (PCT/ISA/210) issued in PCT Application No. PCT/DE2021/100730 dated Dec. 1, 2021 with English translation (four (4) pages).
(Continued)

*Primary Examiner* — Michael Y Mapa
(74) *Attorney, Agent, or Firm* — Crowell & Moring LLP

(57) ABSTRACT

A method for transferring a call from a vehicle to a mobile terminal is provided. According to the method, an emergency call system of the vehicle is initiated in order to place an emergency call, communication between the vehicle and a central unit is established, and at least one part of the communication between the vehicle and the central unit is transferred to a mobile terminal in order to implement a communication connection between the mobile terminal and the central unit.

20 Claims, 2 Drawing Sheets

(58) Field of Classification Search
CPC ............... H04M 3/58; H04M 2207/18; H04M 2242/04; H04M 2250/02
USPC ............. 455/41.1–41.2, 99, 152.1, 297, 345, 455/404.1, 436–444, 569.2, 575.9
See application file for complete search history.

(56) References Cited

U.S. PATENT DOCUMENTS

| | | |
|---|---|---|
| 2010/0267358 A1 | 10/2010 | Staehlin |
| 2015/0341440 A1 | 11/2015 | Nelson et al. |
| 2017/0118178 A1* | 4/2017 | Fruehling ............. H04M 1/026 |
| 2017/0171734 A1 | 6/2017 | Lee et al. |
| 2017/0272935 A1* | 9/2017 | Lei ........................ H04L 67/303 |
| 2022/0157451 A1* | 5/2022 | Elliot ................... H04M 3/5116 |

FOREIGN PATENT DOCUMENTS

| | | |
|---|---|---|
| DE | 10 2016 224 603 A1 | 6/2017 |
| EP | 2 220 631 B1 | 8/2017 |
| WO | WO 2015/151481 A1 | 10/2015 |

OTHER PUBLICATIONS

German-language Written Opinion (PCT/ISA/237) issued in PCT Application No. PCT/DE2021/100730 dated Dec. 1, 2021 (six (6) pages).

German-language Search Report issued in German Application No. 10 2020 126 198.5 dated Jul. 29, 2021 with partial English translation (12 pages).

\* cited by examiner

METHOD AND SYSTEM FOR TRANSFERRING A CALL FROM A MEANS OF TRANSPORTATION TO A MOBILE TERMINAL

The present disclosure relates to a method for transferring a call from a means of transportation to a mobile terminal, a storage medium for carrying out the method, a system for transferring a call from a means of transportation to a mobile terminal and a vehicle having such a system. The present disclosure relates in particular to an eCall transfer from a vehicle to an external mobile apparatus.

BACKGROUND AND SUMMARY OF THE INVENTION

Modern vehicles today often have emergency call systems installed in them that facilitate a communication connection between the vehicle and a rescue center when an emergency arises. An example of such an emergency call system is what is known as the "eCall" or "emergency call" system. eCall is an automatic emergency call system for motor vehicles that is required by the European Union and has needed to be present in all new automobiles (new registrations type) since Mar. 31, 2018. This emergency call system is in particular able to report a traffic accident to the standard European emergency telephone number 112 automatically, and the number of traffic deaths is meant to fall as a result of the rapid rescue measures initiated with pinpoint accuracy.

The functionality of eCall is limited and inflexible, however, and so delays and/or trouble in reporting emergencies and/or in taking necessary measures can occur.

DISCLOSURE OF THE INVENTION

It is an object of the present disclosure to specify a method for transferring a call from a means of transportation to a mobile terminal, a storage medium for carrying out the method, a system for transferring a call from a means of transportation to a mobile terminal and a vehicle having such a system that facilitate more efficient and more flexible use of an emergency call function integrated in the means of transportation.

This object is achieved by way of the subject matter of the independent claims. Advantageous configurations are specified in the dependent claims.

According to an independent aspect of the present disclosure, a method for transferring a call from a means of transportation, in particular a vehicle, to a mobile terminal is specified. The method comprises triggering an emergency call system of the means of transportation to place an emergency call; setting up a communication between the means of transportation and a central processing unit; and transferring at least part of the communication between the means of transportation and the central processing unit to a mobile terminal in order to implement a communication between the mobile terminal and the central processing unit.

According to the invention, an emergency call function installed in the means of transportation is connected to a mobile terminal flexibly, as a result of which the user is able to leave the means of transportation and still remain in contact with the central processing unit, such as a rescue coordination center/command center or other coordinating point (e.g., call center of a vehicle manufacturer that then mediates for the Public Safety Answering Point). This is advantageous, for example, when the user needs to secure an accident site and/or needs to administer first aid outside the means of transportation, but the rescue center still requires further information. There is thus no delay for safety measures and/or rescue measures as a result of the user having to remain in the means of transportation in order to convey the necessary information to the rescue center.

The term mobile terminal covers in particular smartphones but also other mobile telephones, or mobile phones, personal digital assistants (PDAs), Tablet PCs and all established and future electronic devices equipped with a technology for wireless communication. The term mobile terminal can also include hands-free devices that can be connected to the means of transportation, e.g., via Bluetooth, such as headphones.

A mobile terminal is, for example, a device that is capable of wirelessly communicating in a mobile network via local area networks (LANs), such as wireless LAN (WiFi/WLAN), or via wide area networks (WANs) such as Global System for Mobile communication (GSM), General Package Radio Service (GPRS), Enhanced Data Rates for Global Evolution (EDGE), Universal Mobile Telecommunications System (UMTS), High Speed Downlink/Uplink Packet Access (HSDPA, HSUPA), Long-Term Evolution (LTE), or World Wide Interoperability for Microwave Access (WIMAX). Communication using other established or future communication technologies, e.g., 5G mobile radio systems, is possible.

It should be understood that the mobile terminal may be coupled to a hands-free device, as a result of which the user can conduct the call using the hands-free device. The hands-free device may be headphones, or a set of headphones, for example, that are connected to the mobile terminal by wire or wirelessly (e.g., via Bluetooth).

The means of transportation is preferably a vehicle, and in particular a motor vehicle. The means of transportation may be a vehicle (e.g., a motor vehicle), a ship or an aircraft (e.g., a drone for passenger traffic), but is not restricted thereto. The term vehicle includes automobiles, trucks, buses, motor homes, motorcycles, etc., that are used for conveying people, goods, etc. In particular, the term includes motor vehicles for conveying people.

The emergency call system is preferably an "eCall" or "emergency call" system. eCall is an automatic emergency call system for motor vehicles that is required by the European Union and has needed to be present in all new automobiles since Mar. 31, 2018. This emergency call system is in particular able to report a traffic accident to the standard European emergency telephone number 112 automatically and with the inclusion of an MSD (minimum set of data), and the number of traffic deaths is meant to fall as a result of the rapid rescue measures initiated with pinpoint accuracy.

The present disclosure is not limited to eCall, however, and other emergency call systems can be used, such as for example Era Glosnas in Russia or other emergency call systems, e.g., in the USA and China.

The triggering of the emergency call system of the means of transportation to place an emergency call preferably comprises receiving a user input in an operator control element of the means of transportation, the operator control element being configured to place the emergency call. In other words, the emergency call can be triggered manually. By way of example, the operator control element may be a button that is mounted on a roof section of the vehicle, for example, and that can be used, or can be operated, by an occupant of the vehicle.

The present disclosure is not limited to a manual triggering of the emergency call, however, and the triggering can be performed automatically by way of the means of transportation, for example if the means of transportation detects an emergency. The emergency may be an accident, for example, which can be detected by way of appropriate sensors of the means of transportation (e.g., inertial sensors). The emergency may also be a medical emergency for an occupant of the means of transportation, however, such as for example a loss of consciousness, a heart attack, etc., for the occupant, such as a driver of a vehicle. A medical emergency can be detected, or identified, by way of a camera and/or biosensors (e.g., pulse sensor), for example.

The communication between the means of transportation and the central processing unit is preferably performed using a communication profile that is implemented in the means of transportation and associated with the means of transportation.

By way of example, the means of transportation, and in particular the emergency call system, comprises a communication module that is configured to wirelessly communicate using the communication profile in a mobile network. The communication module may be configured for example for a communication based on the LTE (Long-Term Evolution) standard and/or the 5G standard. A communication using other established or future communication technologies is possible. The present disclosure is not restricted to a mobile radio standard, however, and non-mobile-radio standards can be used.

The communication profile is preferably a SIM profile, and in particular an eSIM (embedded subscriber identity module) profile.

The SIM, or eSIM, is a standardized method for securely embedding subscriber information in a module of a device for telecommunication. Security, or data confidentiality, is critical for the communication by means of the eSIM. To this end, the module contains a standardized digital certificate. A multiplicity of different certificates exists worldwide, a specific type of eSIM working only with a specific type of certificate.

The communication between the means of transportation and the central processing unit to the mobile terminal is preferably transferred using a near-field connection, such as a Bluetooth connection, between the means of transportation and the mobile terminal. The present disclosure is not restricted to Bluetooth connections, however, and other wireless near-field connections that facilitate a connection between the means of transportation and the mobile terminal can be used.

In some embodiments, the near-field connection may already exist when the emergency call is triggered, or can be (e.g., automatically) set up following the triggering of the emergency call.

The communication between the means of transportation and the central processing unit to the mobile terminal is preferably transferred using a WLAN connection between the means of transportation and the mobile terminal. In some embodiments, the WLAN connection may already exist when the emergency call is triggered, or can be set up following the triggering of the emergency call.

The near-field connection, such as the Bluetooth connection or the WLAN connection, is preferably provided by way of the means of transportation and outside the means of transportation. The user is thus able to leave the means of transportation without the connection between the mobile terminal and the central processing unit being broken.

In some embodiments in which a near-field connection between the means of transportation and the mobile terminal is used, (all of) the communication between the mobile terminal and the central processing unit can be performed via the means of transportation, and in particular the communication profile of the means of transportation. In other words, the mobile terminal can communicate with the central processing unit indirectly via the means of transportation.

The present disclosure is not limited to this, however, and the communication between the mobile terminal and the central processing unit can be performed using a communication profile (e.g., SIM profile, in particular eSIM profile) of the mobile terminal. By way of example, the communication between the means of transportation and the central processing unit can initially be performed using a communication profile of the vehicle, in particular a SIM profile. The communication can then be transferred from the means of transportation to the mobile terminal in such a way that the communication between the mobile terminal and the central processing unit is performed using the communication profile of the mobile terminal, in particular a SIM profile.

The method preferably comprises outputting a user input request before at least part of the communication is transferred to the mobile terminal, the transfer being performed only when the user confirms the transfer following the user input request. In other words, in some embodiments, the communication can be transferred to the mobile terminal not automatically but rather only following a confirmation from the user. In this case, the transfer is complete only when the call has been accepted on the mobile terminal. This prevents the call from terminating or being lost.

The user input request can be performed by means of suitable output and input units, such as a touch-sensitive screen of an infotainment system. In a further example, the output unit and/or the input unit may be configured for a voice output, or voice input. The present disclosure is not restricted to this, however, and the output unit and/or the input unit can comprise touch-sensitive and/or mechanical keys or switches.

In a further example, the mobile terminal comprises the output unit and/or the input unit. The output unit and/or the input unit is preferably provided by way of a touch-sensitive screen of the mobile terminal.

The present disclosure is not limited to an active user confirmation in this case, and in other embodiments the communication can be transferred to the mobile terminal automatically, that is to say without a confirmation from the user.

The method preferably comprises initiating the transfer of at least part of the communication to the mobile terminal when it is identified that the user of the mobile terminal is leaving or has left the means of transportation. By way of example, the user input request in regard to the transfer of the communication to the mobile terminal can be output when it is identified that the user of the mobile terminal is leaving the means of transportation (e.g., on the basis of opening of the doors) or has left the means of transportation (e.g., when it is identified that the mobile terminal is outside the vehicle).

The transfer of the communication is preferably initiated by way of the mobile terminal, such as by way of a means-of-transportation-related software component of the mobile terminal. By way of example, an app on the mobile terminal identifies the active emergency call and attracts the call by way of an appropriate communication process with the means of transportation.

The communication between the means of transportation and the central processing unit preferably comprises a voice communication and a means-of-transportation-related data communication. The voice communication in this case may be a voice transmission relating to a call between the user and the central processing unit, or the rescue center. The means-of-transportation-related data communication may be an automated communication of specific data, such as for example data relating to a vehicle position, a seat occupancy of the vehicle, a vehicle state (damaged, extent, etc.).

Preferably, only the voice communication is transferred to the mobile terminal. The means-of-transportation-related data communication can continue to be performed in parallel by way of the means of transportation and not pass via the mobile terminal. In other words, in some embodiments, only audio can be routed via the coupled mobile terminal, with the result that only a partial transfer of the emergency call communication to the mobile terminal is performed. The means-of-transportation-related data are therefore transmitted reliably by way of the means of transportation and it is still possible to leave the vehicle during the emergency call.

The communication with the central processing unit is preferably automatically restored if the communication between the mobile terminal and the central processing unit terminates, for example when the user of the mobile terminal hangs up, or ends the call. Automatic setup of the communication with the central processing unit can be omitted or, not be performed, if the central processing unit (e.g., the PSAP) ends the communication.

The communication with the central processing unit is preferably automatically restored in the event of termination by virtue of the central processing unit establishing a (new) communication with the mobile terminal. If the central processing unit is unable to establish a (new) communication with the mobile terminal, for example because the mobile terminal cannot be reached, the central processing unit can establish a (new) communication with the means of transportation.

The voice communication can preferably be transferred to the mobile terminal in such a way that the voice communication is performed both via the mobile terminal and via the means of transportation. In other words, a conference call between the central processing unit, the mobile terminal and the means of transportation can be implemented for the voice communication, as a result of which the risk of losing the communication is reduced.

According to another independent aspect of the present disclosure, a software (SW) program is specified. The SW program can be configured to be executed on one or more processors, and to thereby carry out the method for transferring a call from a means of transportation, in particular a vehicle, to a mobile terminal that is described in this document.

According to another independent aspect of the present disclosure, a storage medium is specified. The storage medium can comprise an SW program that is configured to be executed on one or more processors, and to thereby carry out the method for transferring a call from a means of transportation, in particular a vehicle, to a mobile terminal that is described in this document.

According to another independent aspect of the present disclosure, software containing program code for performing the method for transferring a call from a means of transportation, in particular a vehicle, to a mobile terminal can be executed when the software runs on one or more software-controlled devices.

According to another independent aspect of the present disclosure, a system for transferring a call from a means of transportation, in particular a vehicle, to a mobile terminal is specified. The system comprises one or more processors that are configured to thereby carry out the method for transferring a call from a means of transportation, in particular a vehicle, to a mobile terminal that is described in this document.

A processor, or a processor unit, is a programmable arithmetic and logic unit, that is to say a machine or an electronic circuit that takes transferred instructions as a basis for controlling other elements and in so doing drives an algorithm (process).

According to a further independent aspect of the present disclosure, a means of transportation, in particular a vehicle, is specified. The means of transportation comprises the system for transferring a call from the means of transportation to a mobile terminal that is described in this document.

BRIEF DESCRIPTION OF THE DRAWINGS

Exemplary embodiments of the disclosure are shown in the figures and are described in more detail below.

BRIEF DESCRIPTION OF THE DRAWINGS

Figure 1:
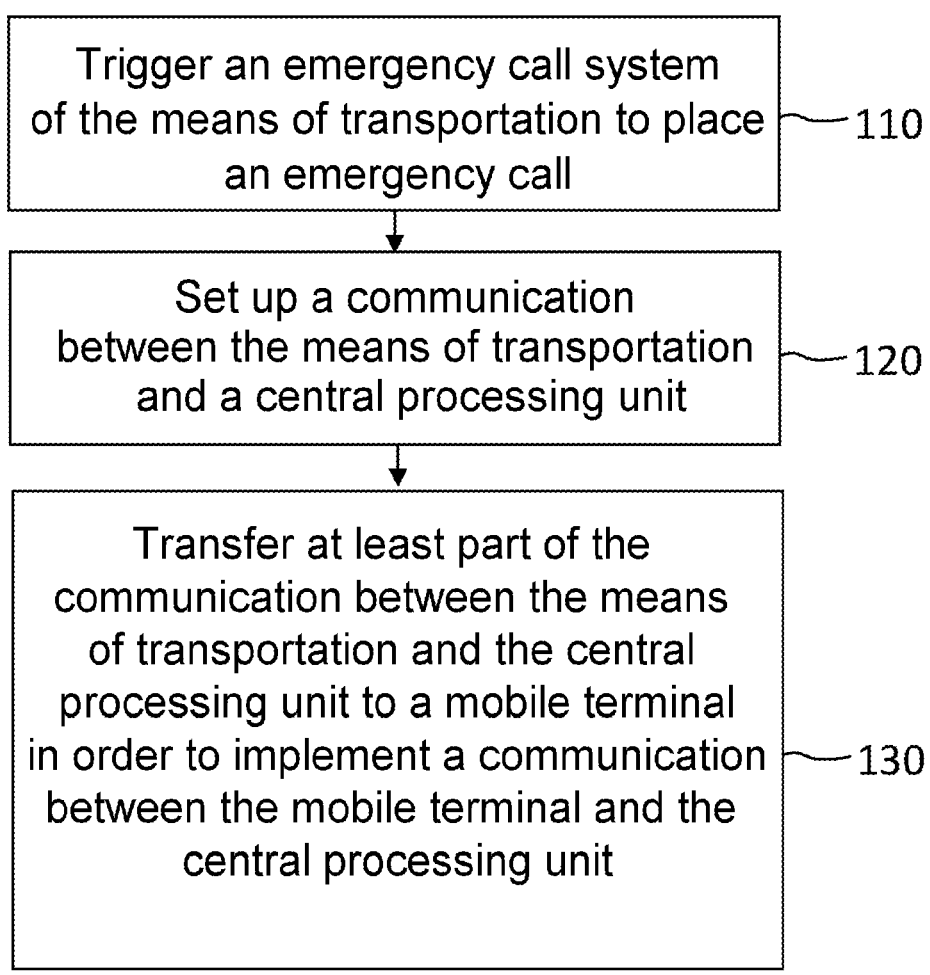
Figure 2:
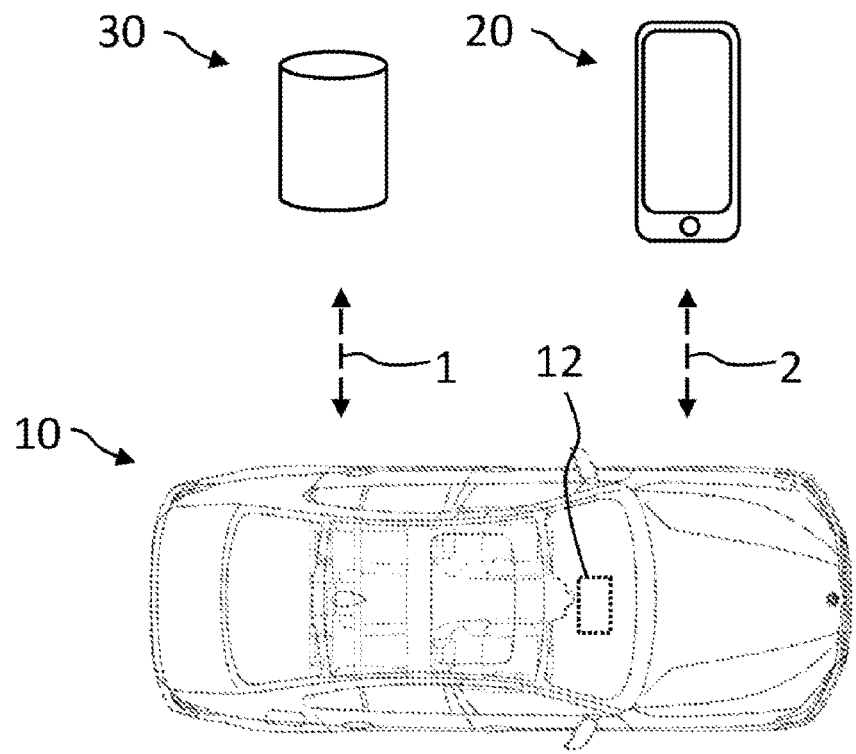
Figure 3:
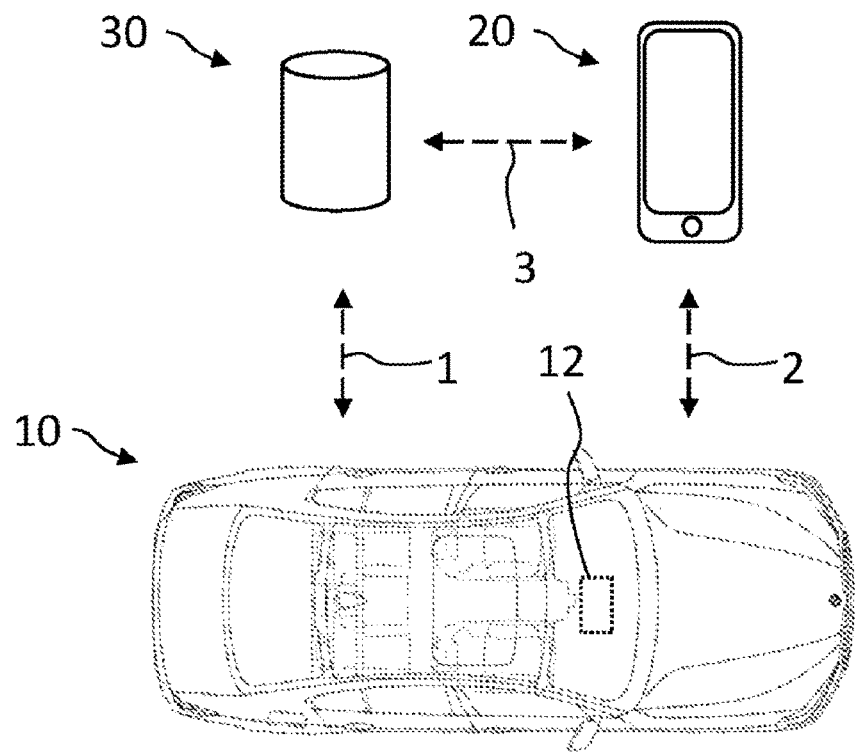

FIG. 1 shows a flowchart for a method for transferring a call from a means of transportation to a mobile terminal according to embodiments of the present disclosure, FIG. 2 schematically shows a means of transportation, a mobile terminal and a central processing unit according to embodiments of the present disclosure, and FIG. 3 schematically shows a means of transportation, a mobile terminal and a central processing unit according to further embodiments of the present disclosure.

DETAILED DESCRIPTION OF THE DRAWINGS

Unless stated otherwise, identical reference signs are used below for elements that are the same and have the same effect.

FIG. 1 shows a flowchart for a method 100 for transferring a call from a means of transportation 10 to a mobile terminal 20 according to embodiments of the present disclosure. FIG. 2 schematically shows a means of transportation 10, a mobile terminal 20 and a central processing unit 30 according to embodiments of the present disclosure.

In some embodiments, the means of transportation 10 is a vehicle, and in particular a motor vehicle.

The method 100 comprises, in block 110, triggering an emergency call system of the means of transportation 10 to place an emergency call; in block 120, setting up a communication between the means of transportation 10 and a central processing unit 30; and, in block 130, transferring at least part of the communication between the means of transportation 10 and the central processing unit 30 to a mobile terminal 20 in order to implement a communication between the mobile terminal 20 and the central processing unit 30.

The method 100 can be implemented by an appropriate piece of software that can be executed by one or more processors (e.g., a CPU).

If the means of transportation 10 is involved in an accident or comes to an accident site, the emergency call can be triggered in the means of transportation 10. The emergency call may be an eCall, for example, that, according to the invention, can be continued using the mobile terminal 20 even if the means of transportation 10 is left. In other words, the user does not have to remain in the means of transportation 10 in order to conduct the eCall. This is advantageous because first aid can be administered, the accident site secured and further steps taken at the same time.

The eCall can be initiated in the means of transportation 10 in this case (e.g., manually using an SOS button, automatically using crash sensors, etc.), and can then be transferred to the mobile terminal 20. The mobile terminal 20 can be selected via a user interface of the means of transportation 10, for example. Alternatively, the mobile terminal 20 may be configured to route the eCall to the mobile terminal 20. This can be performed via an appropriate app on the mobile terminal 20, for example, which identifies the active eCall and attracts the eCall.

The eCall can be transferred from the means of transportation 10 to the mobile terminal 20 with or without consent from the user.

In the example in FIG. 2, the communication between the vehicle 10 and the central processing unit 30 (e.g., a rescue center) is performed via a first communication connection 1. To this end, the vehicle 10, and in particular the emergency call system, comprises a communication module 12 that is configured to wirelessly communicate in a mobile network, for example. The communication module 12 may be configured for example for a communication based on the LTE (Long-Term Evolution) standard and/or the 5G standard. A communication using other established or future communication technologies is possible. The present disclosure is not restricted to a mobile radio standard, however, and non-mobile-radio standards can be used.

In some embodiments, the communication module 12 comprises a communication profile that is implemented in the vehicle 10 and associated with the vehicle 10. The communication profile can be for example a SIM profile, and in particular an eSIM profile.

The communication between the vehicle 10 and the mobile terminal 20 (e.g., a smartphone) can be performed via a second communication connection 2. In some embodiments, the second communication connection 2 can be a near-field connection. The near-field connection can be for example a Bluetooth connection or WLAN connection.

The near-field connection can be provided by way of the vehicle 10 and outside the vehicle 10. The user is thus able to leave the vehicle 10 without the connection, or the call, between the mobile terminal 20 and the central processing unit 30 being broken.

In the example in FIG. 2, all of the communication between the mobile terminal 20 and the central processing unit 30 can be performed via the vehicle 10. In other words, the mobile terminal 20 can communicate with the central processing unit 30 indirectly via the vehicle 10, which means that a (direct) connection between the mobile terminal 20 and the central processing unit 30 is not required.

In some embodiments, means-of-transportation-related data can be sent to the central processing unit 30 by way of the vehicle 10, whereas the audio is routed via the coupled mobile terminal 20. Accident data can therefore be transmitted to the central processing unit 30 reliably, while it is still possible to leave the vehicle 10 during the eCall.

FIG. 3 schematically shows a means of transportation 10, a mobile terminal 20 and a central processing unit 30 according to further embodiments of the present disclosure. The embodiment in FIG. 3 is similar to the embodiment shown in FIG. 2, and therefore only the differences are described below.

In the example in FIG. 3, a communication between the mobile terminal 20 and the central processing unit 30 is performed via a third communication connection 3. By way of example, the mobile terminal 30 comprises a communication module that is configured to wirelessly communicate in a mobile network. The communication module of the mobile terminal 20 may be configured for example for a communication based on the LTE (Long-Term Evolution) standard and/or the 5G standard. A communication using other established or future communication technologies is possible. The present disclosure is not restricted to a mobile radio standard, however, and non-mobile-radio standards can be used.

In some embodiments, the communication module of the mobile terminal 20 comprises a communication profile that is implemented in the mobile terminal 20 and associated with the mobile terminal 20. The communication profile may be for example a SIM profile, and in particular an eSIM profile.

In some embodiments, the communication between the vehicle 10 and the central processing unit 30 can initially be performed using the communication profile of the vehicle, in particular a SIM profile. The communication can then be transferred from the vehicle 10 to the mobile terminal 20 in such a way that the communication between the mobile terminal 20 and the central processing unit 30 is performed using the communication profile of the mobile terminal 20, in particular a SIM profile.

By way of example, it is thus possible, in the case of a manual eCall, to send the data to the central processing unit 30 via a SIM of the vehicle 10, but to have the audio pass via the coupled mobile terminal 20. Accident data can therefore be transmitted to the central processing unit 30 reliably, while it is still possible to leave the vehicle 10 during the eCall.

According to the invention, an emergency call function installed in the means of transportation is connected to a mobile terminal flexibly, as a result of which the user is able to leave the means of transportation and still remain in contact with the central processing unit, such as a rescue center. This is advantageous for example when the user needs to secure an accident site and/or needs to administer first aid outside the means of transportation, but the rescue center still requires further information. There is thus no delay for safety measures and/or rescue measures as a result of the user having to remain in the means of transportation in order to convey the necessary information to the rescue center.

Although the invention has been illustrated and explained more specifically in detail by way of preferred exemplary embodiments, the invention is not restricted by the disclosed examples and other variations can be derived therefrom by a person skilled in the art without departing from the scope of protection of the invention. It is clear, therefore, that a multiplicity of possible variations exist. It is also clear that embodiments mentioned by way of example are really only examples which should not be considered in any way as limiting the range of protection, the possible applications or the configuration of the invention, for example. Instead, the preceding description and the description of the figures enable a person skilled in the art to implement the illustrative embodiments in concrete form, a person skilled in the art, knowing the disclosed concept of the invention, being able to make various changes, for example with regard to the operation or the arrangement of individual elements mentioned in an illustrative embodiment, without departing from the range of protection defined by the claims and the legal equivalents thereof, such as, for instance, further explanations in the description.

The invention claimed is:

1. A method for transferring a call from a means of transportation to a mobile terminal, the method comprising:
   triggering an emergency call system of the means of transportation to place an emergency call;
   setting up a communication between the means of transportation and a central processing unit;
   transferring at least part of the communication between the means of transportation and the central processing unit to the mobile terminal in order to implement a communication between the mobile terminal and the central processing unit; and
   determining whether the communication between the mobile terminal and the central processing unit has ended, maintaining an end of the communication based on a determination that the central processing unit ended the communication, and automatically restoring the communication based on a determination that the mobile terminal ended the communication.

2. The method according to claim 1, wherein the triggering of the emergency call system of the means of transportation to place the emergency call comprises:
   receiving a user input in an operator control element of the means of transportation, the operator control element being configured to place the emergency call.

3. The method according to claim 2, wherein the communication between the means of transportation and the central processing unit is transferred to a mobile terminal using one of the following aspects:
   a Bluetooth connection between the means of transportation and the mobile terminal; and
   a WLAN connection between the means of transportation and the mobile terminal, the WLAN connection in particular being provided by way of the means of transportation and outside the means of transportation.

4. The method according to claim 2, wherein:
   the communication between the means of transportation and the central processing unit is performed using a communication profile of the means of transportation, and
   the communication is transferred from the means of transportation to the mobile terminal in such a way that the communication between the mobile terminal and the central processing unit is performed using (i) the communication profile of the means of transportation or (ii) a SIM profile of the mobile terminal.

5. The method according to claim 2, further comprising:
   outputting a user input request before the communication is transferred to the mobile terminal, a transfer being performed only when the user confirms the transfer following the user input request.

6. The method according to claim 2, further comprising:
   initiating a transfer of the communication to the mobile terminal when it is identified that the user of the mobile terminal is leaving or has left the means of transportation.

7. The method according to claim 2, wherein a transfer is initiated by way of the mobile terminal via a means-of-transportation-related software component of the mobile terminal.

8. The method according to claim 2, wherein the communication between the means of transportation and the central processing unit comprises a voice communication and a means-of-transportation-related data communication, and wherein only the voice communication is transferred to the mobile terminal.

9. The method according to claim 1, wherein the communication between the means of transportation and the central processing unit is transferred to the mobile terminal using one of the following aspects:
   a Bluetooth connection between the means of transportation and the mobile terminal; and
   a WLAN connection between the means of transportation and the mobile terminal, the WLAN connection in particular being provided by way of the means of transportation and outside the means of transportation.

10. The method according to claim 9, wherein:
    the communication between the means of transportation and the central processing unit is performed using a communication profile of the means of transportation, and
    the communication is transferred from the means of transportation to the mobile terminal in such a way that the communication between the mobile terminal and the central processing unit is performed using (i) the communication profile of the means of transportation or (ii) a SIM profile of the mobile terminal.

11. The method according to claim 9, further comprising:
    outputting a user input request before the communication is transferred to the mobile terminal, a transfer being performed only when the user confirms the transfer following the user input request.

12. The method according to claim 9, further comprising:
    initiating a transfer of the communication to the mobile terminal when it is identified that the user of the mobile terminal is leaving or has left the means of transportation.

13. The method according to claim 1, wherein:
    the communication between the means of transportation and the central processing unit is performed using a communication profile of the means of transportation, and
    the communication is transferred from the means of transportation to the mobile terminal in such a way that the communication between the mobile terminal and the central processing unit is performed using (i) the communication profile of the means of transportation or (ii) a SIM profile of the mobile terminal.

14. The method according to claim 1, further comprising:
    outputting a user input request before the communication is transferred to the mobile terminal, a transfer being performed only when the user confirms the transfer following the user input request.

15. The method according to claim 1, further comprising:
    initiating a transfer of the communication to the mobile terminal when it is identified that the user of the mobile terminal is leaving or has left the means of transportation.

16. The method according to claim 1, wherein a transfer is initiated by way of the mobile terminal via a means-of-transportation-related software component of the mobile terminal.

17. The method according to claim 1, wherein the communication between the means of transportation and the central processing unit comprises a voice communication and a means-of-transportation-related data communication, and wherein only the voice communication is transferred to the mobile terminal.

18. A non-transitory computer-readable medium containing a software program that is configured to be executed on one or more processors to carry out a method comprising:

triggering an emergency call system of a means of transportation to place an emergency call;

setting up a communication between the means of transportation and a central processing unit;

transferring at least part of the communication between the means of transportation and the central processing unit to a mobile terminal in order to implement a communication between the mobile terminal and the central processing unit; and determining whether the communication between the mobile terminal and the central processing unit has ended, maintaining an end of the communication based on a determination that the central processing unit ended the communication, and automatically restoring the communication based on a determination that the mobile terminal ended the communication.

19. A system for transferring a call from a means of transportation to a mobile terminal, comprising a processor programmed to execute a method comprising:

triggering an emergency call system of the means of transportation to place an emergency call;

setting up a communication between the means of transportation and a central processing unit;

transferring at least part of the communication between the means of transportation and the central processing unit to the mobile terminal in order to implement a communication between the mobile terminal and the central processing unit; and determining whether the communication between the mobile terminal and the central processing unit has ended, maintaining an end of the communication based on a determination that the central processing unit ended the communication, and automatically restoring the communication based on a determination that the mobile terminal ended the communication.

20. A vehicle comprising the system according to claim 19.

* * * * *